(12) United States Patent
Gnadt (10) Patent No.: US 7,198,440 B2
(45) Date of Patent: Apr. 3, 2007

(54) WORKPIECE LOADING APPARATUS FOR MACHINE TOOL

(75) Inventor: James J. Gnadt, Fairport, NY (US)

(73) Assignee: The Gleason Works, Rochester, NY (US)

( * ) Notice: Subject to any disclaimer, the term of this patent is extended or adjusted under 35 U.S.C. 154(b) by 529 days.

(21) Appl. No.: 10/780,046

(22) Filed: Feb. 17, 2004

(65) Prior Publication Data

US 2004/0161314 A1    Aug. 19, 2004

Related U.S. Application Data (60) Provisional application No. 60/447,970, filed on Feb. 18, 2003.

(51) Int. Cl.
*B23F 23/02* (2006.01)
*B23F 23/06* (2006.01)

(52) U.S. Cl. ............... 409/6; 409/62; 409/27; 82/124; 451/244

(58) Field of Classification Search ............ 409/6, 409/7, 131, 62, 132, 27; 82/124, 125, 129; 451/244; B23F 23/02, 23/04, 23/06
See application file for complete search history.

(56) References Cited

U.S. PATENT DOCUMENTS

| | | | |
|---|---|---|---|
| 2,389,083 A | * | 11/1945 | Rosengren ............ 409/7 |
| 2,546,684 A | * | 3/1951 | Ashton .............. 82/124 |
| 2,782,689 A | * | 2/1957 | Carlsen et al. ........... 409/7 |
| 2,910,919 A | * | 11/1959 | Rye .................. 409/6 |
| 3,635,323 A | | 1/1972 | Helfer et al. |
| 4,383,457 A | * | 5/1983 | Corcoran ............ 82/1.11 |
| 5,088,361 A | * | 2/1992 | Kojima et al. ........ 82/127 |
| 5,213,559 A | * | 5/1993 | Lunazzi .............. 483/14 |
| 5,309,368 A | * | 5/1994 | Chern .............. 700/179 |
| 5,313,861 A | * | 5/1994 | Ikeda .............. 82/1.11 |
| 5,704,262 A | * | 1/1998 | Baumbusch et al. ...... 82/124 |

FOREIGN PATENT DOCUMENTS

| JP | 2002254245 A | * | 9/2002 |
|---|---|---|---|
| WO | 02 066193 | | 8/2002 |

* cited by examiner

*Primary Examiner*—Daniel W. Howell
(74) *Attorney, Agent, or Firm*—Robert L. McDowell (57) ABSTRACT

Method and apparatus for positioning a workpiece in a spindle of a machine tool and/or removing a workpiece from the spindle. The machine spindle includes an axis of rotation and the workpiece includes a centerline extending between a first end surface and a second end surface. A mechanism is provided for grasping the workpiece, preferably on its centers, in a position proximate the spindle whereby the workpiece centerline is coincident with the axis of rotation of the spindle. The spindle is moved relative to the workpiece in the direction of the axis of rotation whereby the workpiece is inserted into the spindle or removed from the spindle.

9 Claims, 9 Drawing Sheets

WORKPIECE LOADING APPARATUS FOR MACHINE TOOL

This application claims the benefit of U.S. Provisional Patent Application No. 60/447,970 filed Feb. 18, 2003.

FIELD OF THE INVENTION

The present invention is directed to an apparatus for loading a workpiece onto a machine tool and, more particularly, for loading a gear workpiece onto a gear manufacturing machine.

BACKGROUND OF THE INVENTION

In the context of the present invention, the term "bevel" gears is understood to be of sufficient scope to include those types of gears known as bevel gears, "hypoid" gears, as well as those gears known as "crown" or "face" gears. A bevel gear pair is generally considered to comprise a ring gear (usually the driven member) and a smaller pinion (usually the driving member). Generally, the pinion has fewer teeth than the ring gear and usually includes a shaft of some length extending from the back surface of the head portion of the pinion.

In loading, or unloading, a bevel pinion into, or from, a gear manufacturing machine (either a cutting machine or finishing machine, such as a grinding machine), one practice has been to grip the pinion about its head portion and then manipulating it into a chucking mechanism located in the work head of a machine tool. A gripping mechanism of the type shown in U.S. Pat. No. 3,635,323 to Helfer et al. comprises jaw members, for gripping the back surface of a pinion, together with a centering cup and centering pin. This mechanism, however, is expensive to manufacture and requires changing the centering cup and adjusting, or replacing, the jaw members when a different size pinion is to be gripped.

SUMMARY OF THE INVENTION

The present invention comprises a loading and unloading assembly whereby a workpiece is clamped on its centers and the clamping mechanism carries the workpiece into and out of the workholding mechanism of a machine tool.

DETAILED DESCRIPTION OF THE PREFERRED EMBODIMENT

The details of the present invention will now be discussed with reference to the accompanying drawings which illustrate the present invention by way of example only. In the drawings, similar features or components will be referred to by like reference numbers.

Figure 1:
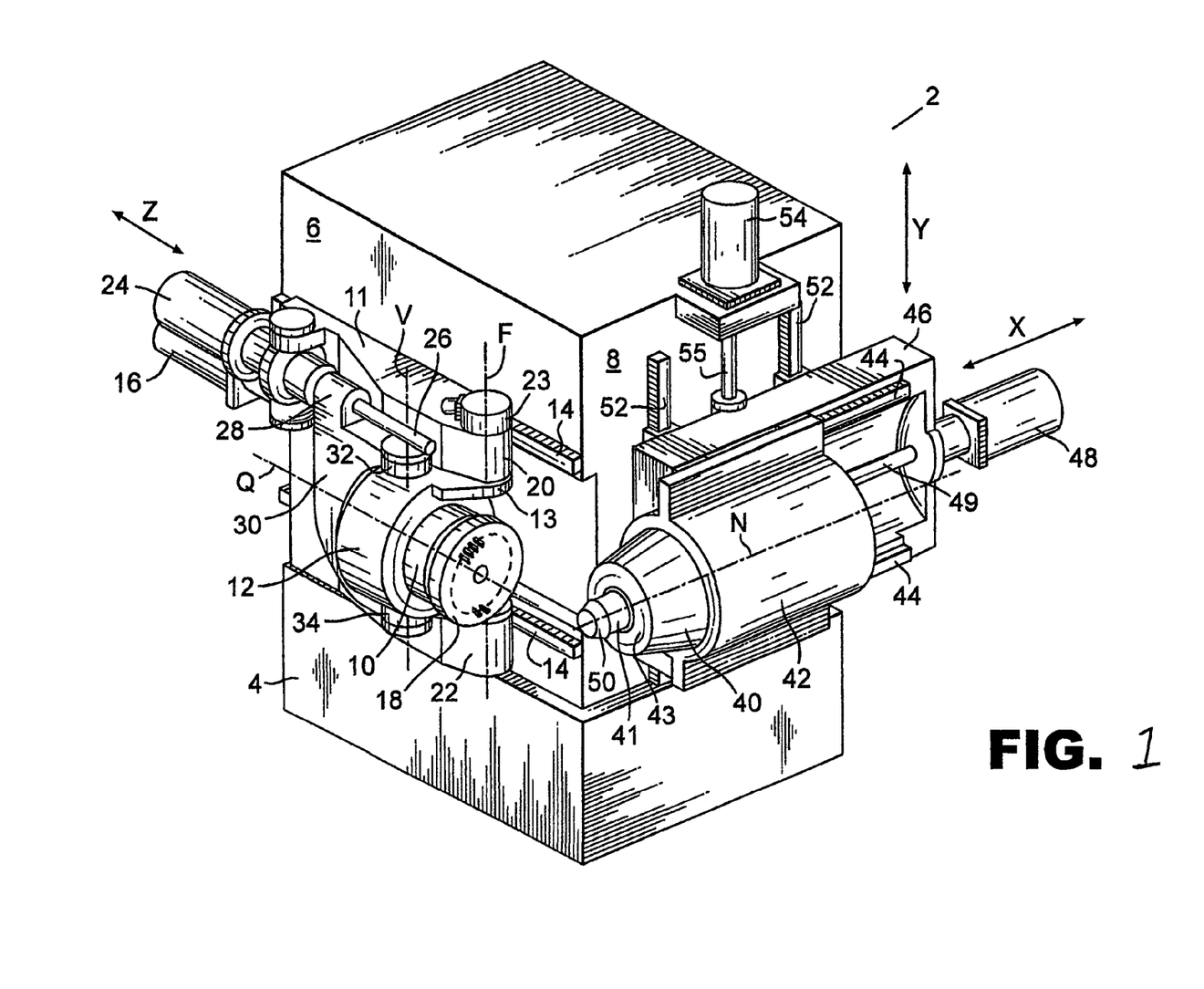
FIG. 1 schematically illustrates a preferred machine on which the inventive loading assembly may be placed.

An preferred exemplary machine for manufacturing bevel gears on which the inventive loading apparatus may be included is illustrated in FIG. 1. Machines of this type are known and are commercially available from The Gleason Works, Rochester, N.Y. Aside from the details of the machine (below) which are sufficient for an understanding of the operation of the inventive loading apparatus, complete details of the machine of FIG. 1 may be found by referring to WIPO Publication No. WO 02/066193 the disclosure of which is hereby incorporated by reference. For ease in viewing the various machine components, FIG. 1 illustrates the machine without doors and exterior sheet metal.

The machine 2 comprises a single stationary column 4, which is preferably a monolithic structure such as cast iron, and comprises a first side 6 and second side 8, being oriented at a desired angle, preferably perpendicular, to one another. Each of the first and second sides comprises a width and a height (as viewed in FIG. 1).

First side 6 includes first spindle 10 having a front or seating surface 15. Spindle 10 is rotatable about axis Q and is preferably driven by a direct drive motor 12. Spindle 10 is pivotably secured to a spindle support 11 which, along with spindle 10, is movable in direction Z along the width of first side 6 on ways 14 attached to column 4. Movement of spindle 10 in direction Z is provided by motor 16 through a direct-coupled ballscrew (not shown) or by direct drive. Preferably, a cutting or grinding tool 18 (cutting tool is shown) is releasably mounted to spindle 10 by suitable mounting equipment as is known in the art.

As stated above, first spindle 10 is attached to spindle support 11 such that pivoting of the spindle, and hence the tool 18, may occur about pivot axis F. Spindle bracket 13 is pivotally attached to support 11 via at least one, and preferably two, bearing connections 20 and 22, upper bearing connection 20 and lower bearing connection 22. Pivoting of spindle 10 is effected by motor 24 and direct-coupled ballscrew 26, or by direct drive, acting through sleeve portion 28 of yolk 30. Yolk 30 is pivotally attached to spindle 10 preferably at an upper connection 32 and a lower connection 34 such that yolk 30 may angularly move relative to spindle 10 about axis V. Advancing of ballscrew 26, and hence yolk 30, effectively pushes drive motor 12 angularly away from column 4 thereby causing a pivot motion about axis F to angularly move the tool 18 toward the machine column 4. Of course, retracting ballscrew 26 has the opposite effect.

Second side 8 includes second spindle 40 which is rotatable about axis N and is preferably driven by a direct drive motor 42. Spindle 40 is movable in direction X along the width of second side 8 on ways 44 attached to slide 46. Movement of spindle 40 in direction X is provided by motor 48 through a direct-coupled ballscrew 49 or by direct drive. Preferably, a workpiece (a pinion 50 in FIG. 1) is releasably mounted to spindle 40 by suitable workholding equipment 41 as is known in the art. Spindle 40 is also movable in direction Y along the height of second side 8 since slide 46 is movable in the Y direction via ways 52 with movement being provided by motor 54 through a direct-coupled ballscrew 55 or by direct drive. Directions X, Y and Z are preferably mutually perpendicular with respect to one another although one or more may be inclined with respect to its perpendicular orientation. For purposes of illustration, in all FIG. 1, the Y direction is vertical.

Movement of first spindle 10 in direction Z, second spindle 40 in direction X, second spindle 40 via slide 46 in direction Y, pivoting of first spindle 10 about axis F, as well as first spindle 10 rotation and second spindle 40 rotation, is imparted by the separate drive motors 16, 48, 54, 24, 12 and 42 respectively. The above-named components are capable of independent movement with respect to one another or may move simultaneously with one another. Each of the respective motors is preferably associated a feedback device such as a linear or rotary encoder, such as pivot axis encoder 23 (FIG. 1), as part of a CNC system which governs the operation of the drive motors in accordance with instructions input to a computer controller (i.e. CNC) such as the Fanuc model 160i or Siemens model 840D (not shown).

Figure 2:
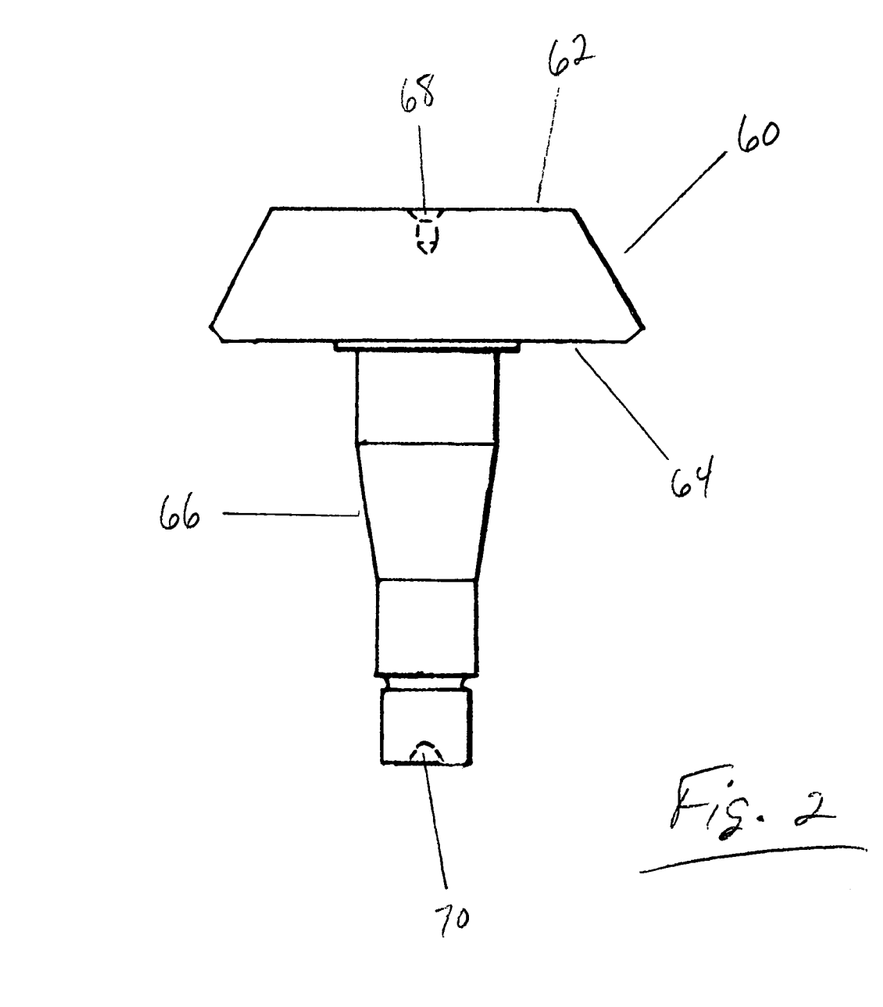
FIG. 2 illustrates the pinion member of a bevel gear pair.

The inventive loading, and unloading, apparatus utilizes existing machine motions for placing and removing workpieces into/from the chucking mechanism of a gear manufacturing machine. The present invention is adapted primarily for the pinion member of a bevel gear pair. An example of a pinion member is shown in FIG. 2 which illustrates a pinion 60, which should be understood to represent a pinion blank or a machined pinion comprising teeth, that would be loaded into a machine such as a cutting or grinding machine as is appropriate. A pinion blank is understood to represent a workpiece such as shown in FIG. 2 that is ready for machining on a gear processing machine but as yet has no tooth surfaces formed thereon. Pinion 60 includes a front face 62, back surface 64 and shank 66. The form and length of the pinion shank is dictated by the ultimate use of the machined pinion member. Pinion 60 usually includes a front center 68 and a shank center 70 which are usually formed in the material blank prior to formation of a pinion blank. Formation of the centers ensures accurate placement and processing of the material blank on a turning machine, such as a lathe, that is utilized to form the pinion blank. It should be understood, however, that formation of the centers need not be restricted to turning operations of the pinion blank. Centers may be formed by any means, such as machining, forging or casting, and may be present but not used during turning or may be formed subsequent to any turning but prior to placement on the gear manufacturing machine.

The preferred embodiment of the present invention utilizes the front center 68 and shank center 70 of the pinion 60 to align the pinion such that existing machine motions can be effected to place the pinion into and remove the pinion from a chucking mechanism in the gear manufacturing machine. By grasping the pinion in an orientation such that the front and rear centers are in alignment with the axis of the workpiece spindle 40 (axis N in FIG. 1), only linear movement of the workpiece spindle (X direction in FIG. 1) is necessary to capture the pinion shank in the workholding equipment 41 (e.g. the chuck) of the workpiece spindle 40.

Figure 3:
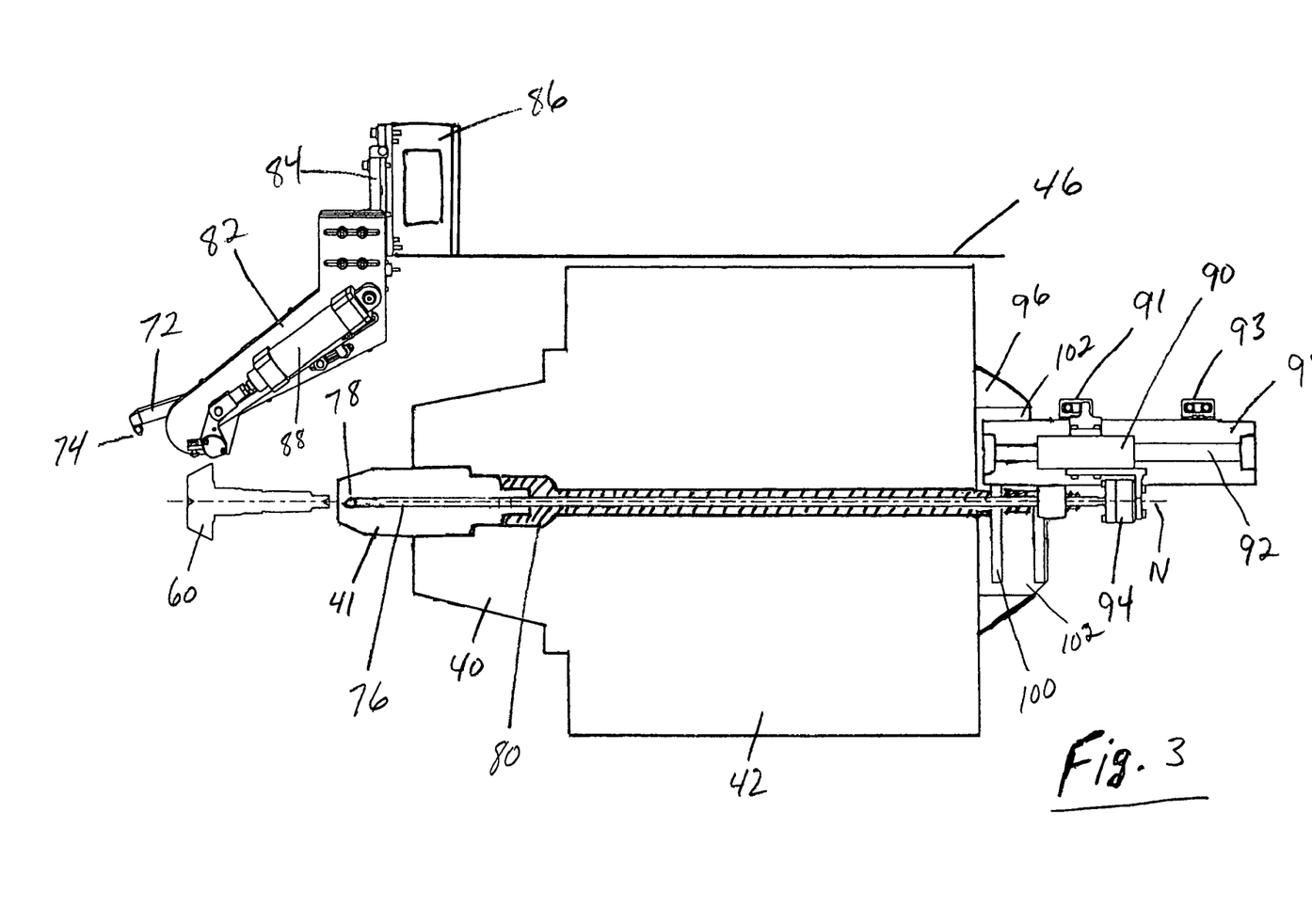
FIG. 3 shows the inventive loading assembly with a pinion in the released or presented position.

With reference to FIG. 3, the grasping of the pinion is preferably accomplished by a pair of mechanisms comprising a pivotable finger 72 (shown in the "up" position) having a tip 74 for insertion into the front center 68 of a pinion, and, a contact rod 76 having a tip 78 for insertion into the shank center 70 of the pinion.

Figure 7:
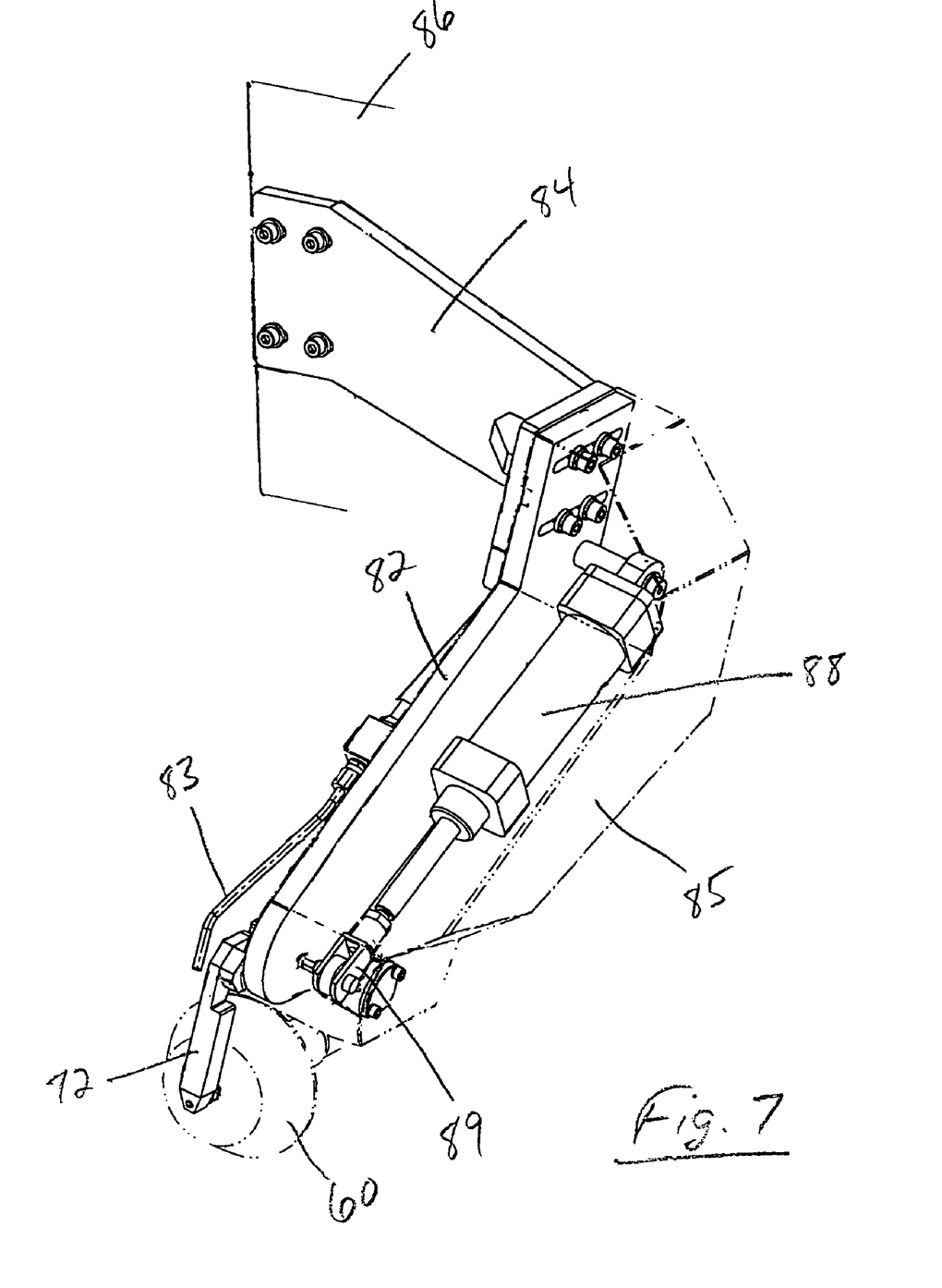
FIG. 7 is an enlarged view of the pivoting finger with its actuating mechanism and mounting brackets.

Pivotable finger 72 is positioned via one or more brackets (82, 84 and 86 shown in FIG. 3 or FIG. 7) so that it is movable in the vertical (Y) direction with the workpiece spindle 40. In the machine of FIG. 1, bracket 86 is mounted to slide 46 which results in the pivotable finger 72 being movable in the Y direction but not in the X direction. Relative motion between the pivotable finger 72 and the workpiece spindle 40 is accomplished by the movement of the spindle 40 in the X direction along axis N. Pivotable finger 72 must also be positioned so that upon pivoting via cylinder 88 and appropriate linkage 89 to the "down" position (FIGS. 4 or 7), the tip 74 will axially coincide with the position of the tip 78 of the contact rod 76 so that both tips can enter the respective centers of a pinion. If desired, one or more air nozzles 83 may be positioned to remove any chips or other debris that may accumulate around the pivoting finger 72 or its tip 74. Furthermore, the cylinder 88 and its linkages 89 may be enclosed with appropriate guarding 85.

While FIG. 3 shows pivotable finger 72 being positioned via brackets 82, 84 and 86, it is to be understood that the present invention is not limited to the illustrated bracket configuration but instead contemplates any mounting apparatus capable of properly positioning pivoting finger 72 in the machining chamber of the gear manufacturing machine.

Contact rod 76 is preferably positioned for axial movement within the draw rod 80 that is used to open and close the chuck 41. Draw rods, per se, are well known to the skilled artisan and do not form part of the present invention. Being positioned within draw rod 80 as shown in FIG. 3 results in contact rod 76 being oriented coincident with axis N. Contact rod 76 is preferably moved to various axial positions (discussed below) by the action of cylinder 90 movable on rail 92 and connected to contact rod 76 via connector 94. Rail 92 is mounted to a rear portion 96 of the spindle motor 42 via brackets 98, 100 and mounting plates 102. Cylinder 90 is movable to various positions as defined by stops 91 and 93.

While FIG. 3 shows cylinder 90 and rail 92 being mounted to a rear portion 96 of the spindle motor 42 via brackets 98, 100 and mounting plates 102, it is to be understood that the present invention is not limited to the illustrated configuration but instead contemplates any apparatus capable of correctly positioning contact rod 76. Given space limitations as well as the likelihood of interference with other machine components, the mechanism which moves and controls the position of the contact rod 76 should be designed based on the space and interference constraints of a given machine. The same is also applicable with respect to the pivoting finger 72 which may be of an alternative design given space and interference limitations. However, given the machine of FIG. 1, the assembly for moving contact rod 76 and the assembly for mounting and actuating the pivoting finger 72 as shown in FIG. 3 is preferred. The present invention also contemplates connecting the front center contacting means (e.g. pivoting finger 72) and the rear center contacting means (e.g. rod 76) with a common mechanism (e.g. mechanical, hydraulic or pneumatic) that would actuate both contacting means.

A sequence of loading a pinion into a workpiece chuck in a gear manufacturing machine as shown in FIG. 1 will now be discussed. In this example, the machine will be a gear cutting machine and the workpiece will be a pinion blank.

Figure 4:
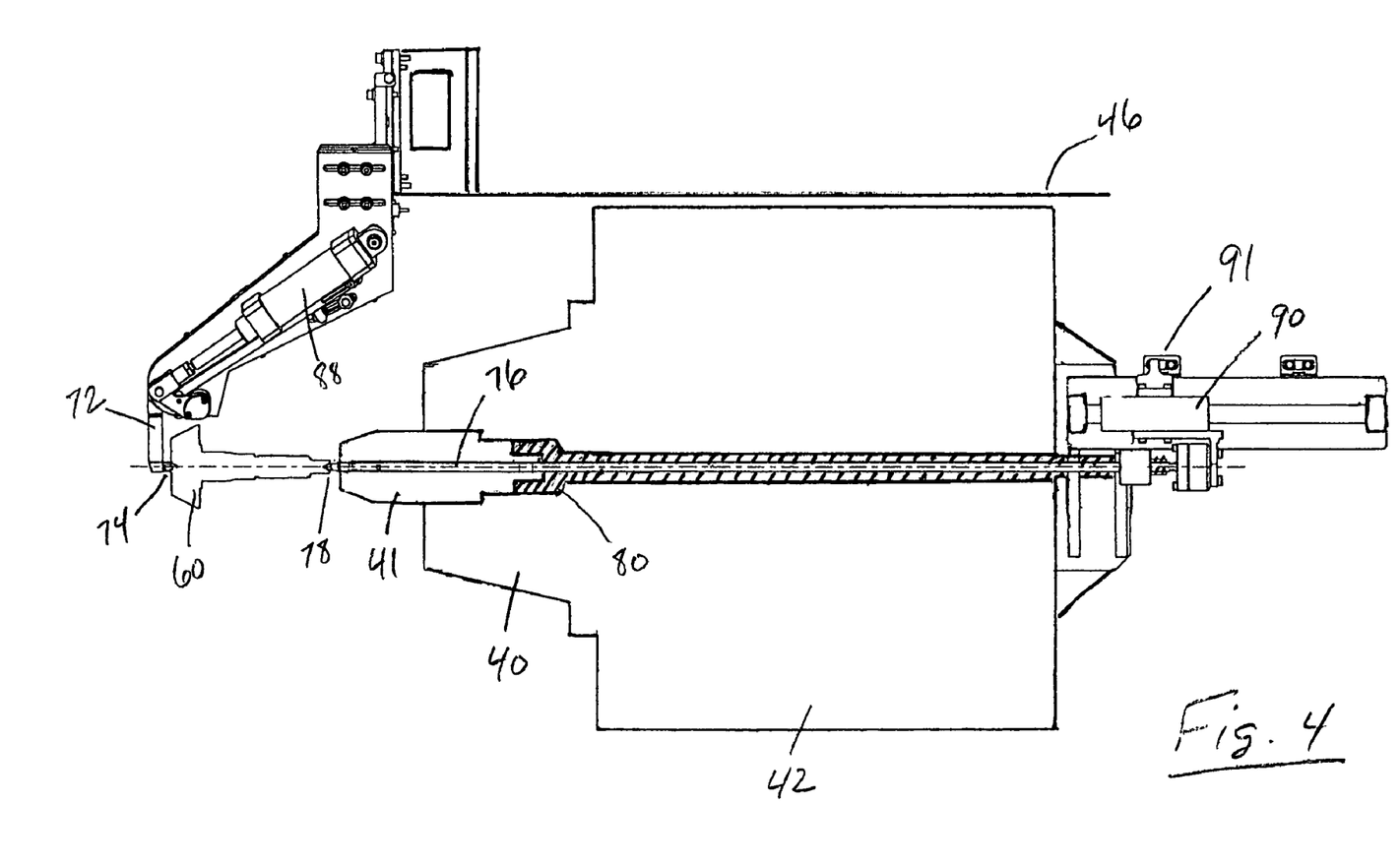
FIG. 4 shows the inventive loading assembly with a pinion in the grasped position.

Referring to FIG. 3, a pinion blank 60 is brought into position in a work chamber of the gear cutting machine. Since in the machine of FIG. 1 there is no motion of the spindle 40 or the pivoting finger 72 in the Z direction, the pinion blank 60 is positioned such that its centerline (i.e. its axis) lies in the proper Z direction position (that is, in the vertical plane containing the axis N of the workpiece spindle 40). It is also necessary that the front center 68 is located in the X direction at the appropriate position to coincide with the tip 74 in the "down" position (as seen in FIG. 4). The spindle 40 is positioned such that the front face of the workholding equipment 41 (a chuck in FIG. 1) is sufficiently close to the end of the pinion shank such that contact rod 76 can be inserted into the shank center 70. Contact rod 76 may be advanced to a forward position by cylinder 90 according to the rear set position of stop 91.

Once positioned as described above, FIG. 4 shows the next step of grasping the pinion wherein the pivoting finger 72 is actuated to the "down" position by cylinder 88 to pivot and insert tip 74 into front center 68 while at the same time contact rod 76 is advanced by cylinder 90 (to the forward set position on stop 91) to extend tip 78 beyond the front face of chuck 41 and into shank center 70.

Figure 5:
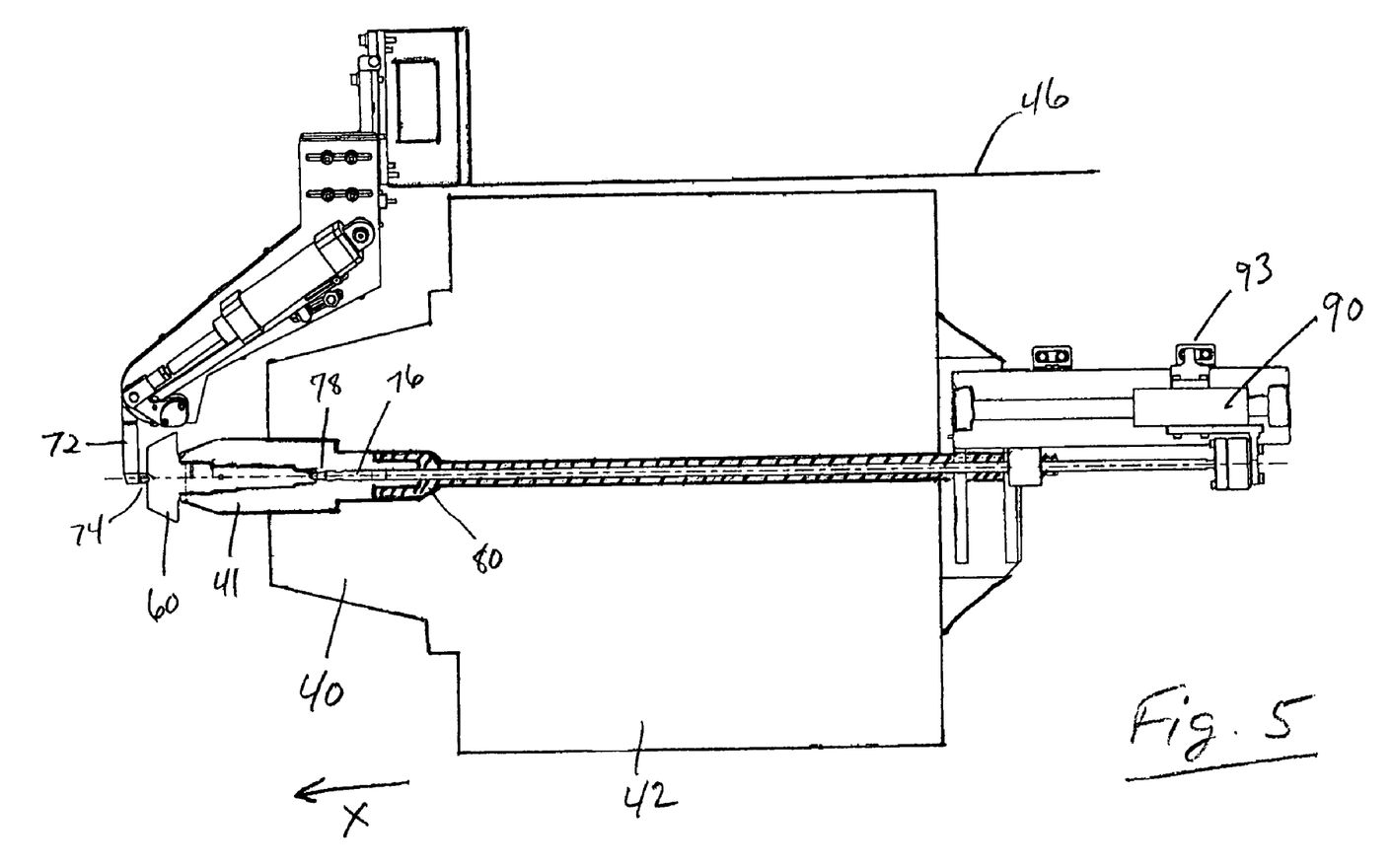
FIG. 5 shows the inventive loading assembly with a pinion in the part-seated position.

Once the pinion is grasped, FIG. 5 shows the pinion being seated in the chuck 41 by the simultaneous forward movement of the spindle 40 in the X direction and the rearward movement of contact rod 76 brought about by movement of cylinder 90 moving to the forward set position on stop 93.

Figure 6:
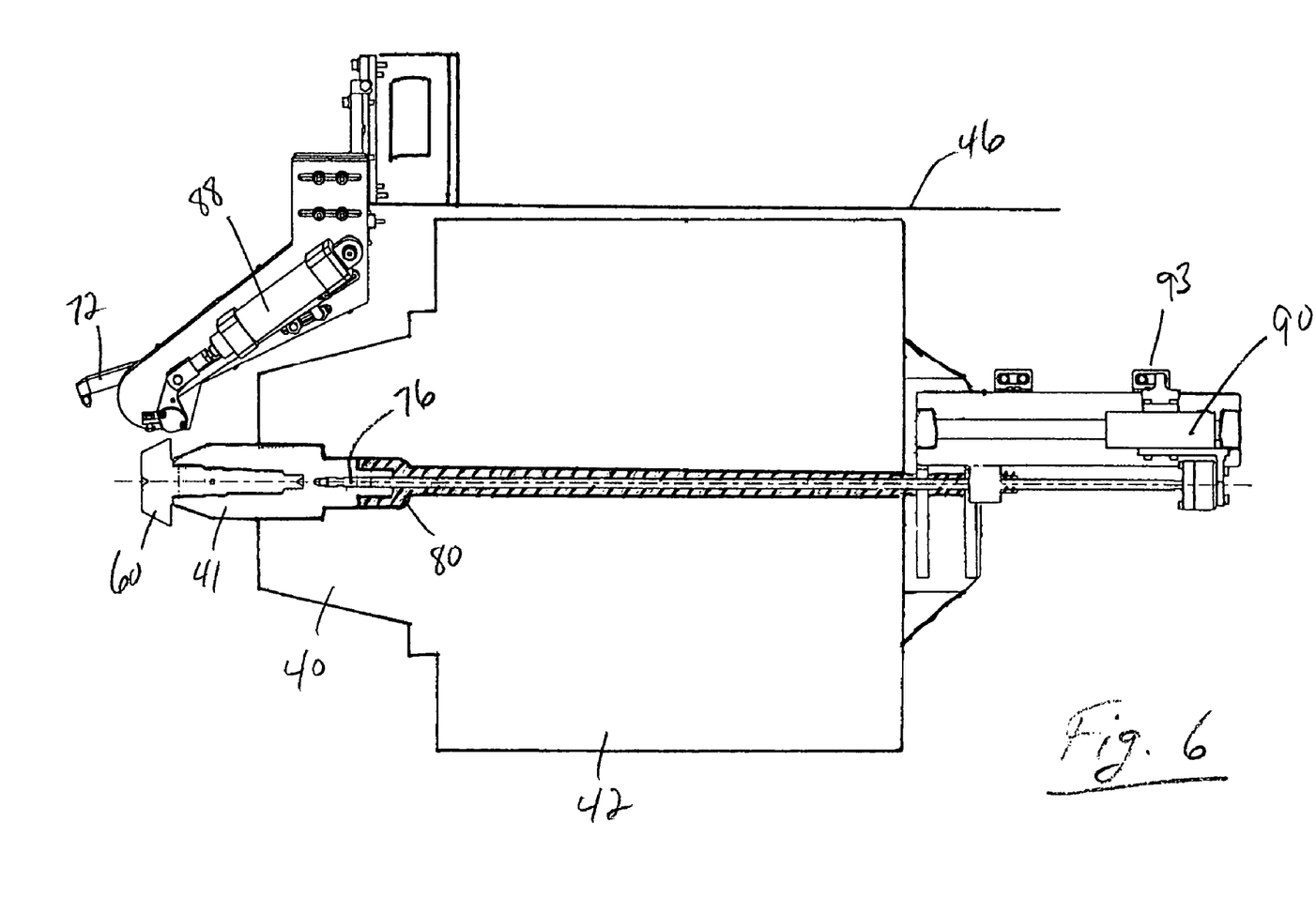
FIG. 6 shows the inventive loading assembly with a pinion in the chucked position.

Once the pinion is seated, it is chucked. After chucking, as seen in FIG. 6, the pivoting finger 72 is returned to the "up" position by cylinder 88 and the contact rod 76 is moved out of engagement by further rearward movement of cylinder 90 to the rear set position on stop 93.

Of course it should be understood that the sequence shown by FIGS. 3–6 is reversed for removing a chucked workpiece from the gear manufacturing machine. The loading and unloading sequences as well as the operation of the shuttle system and conveyors (described below) are controlled by the machine computer operating in accordance with input instructions.

Figure 8:
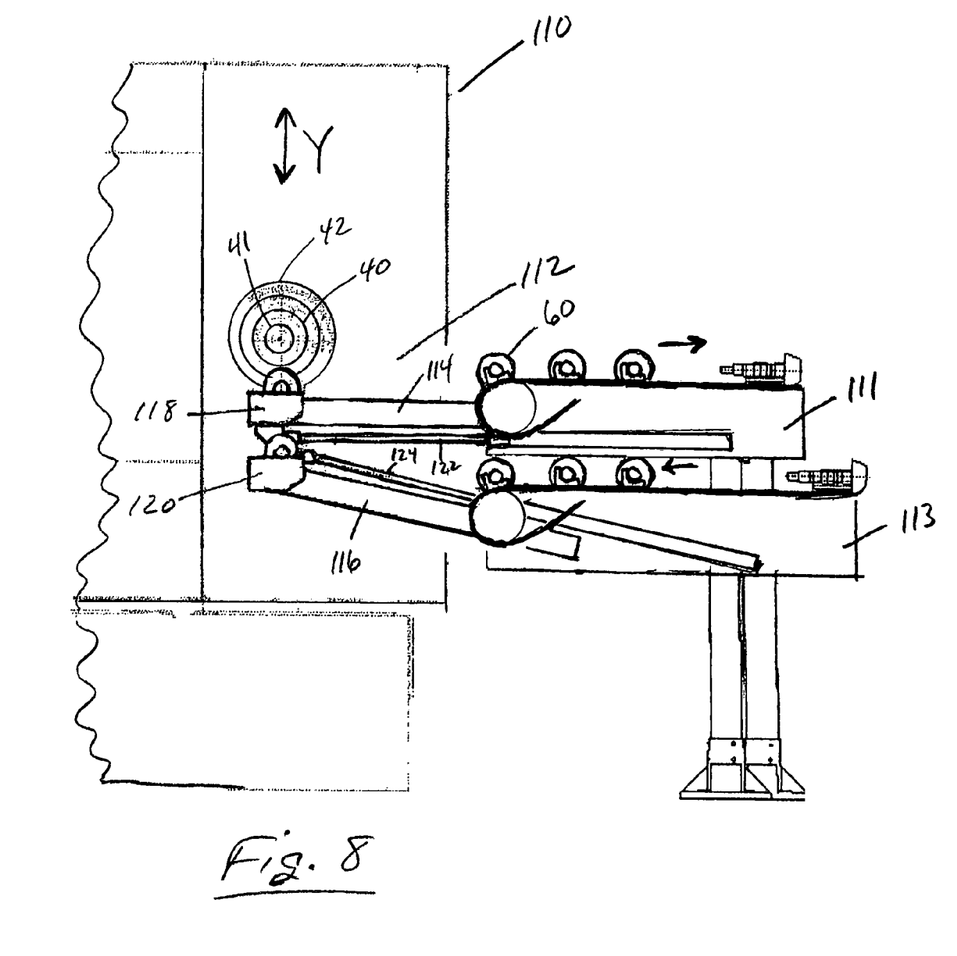
FIG. 8 illustrates a shuttle system for providing workpieces to and removing workpieces from the loading assembly.
Figure 9:
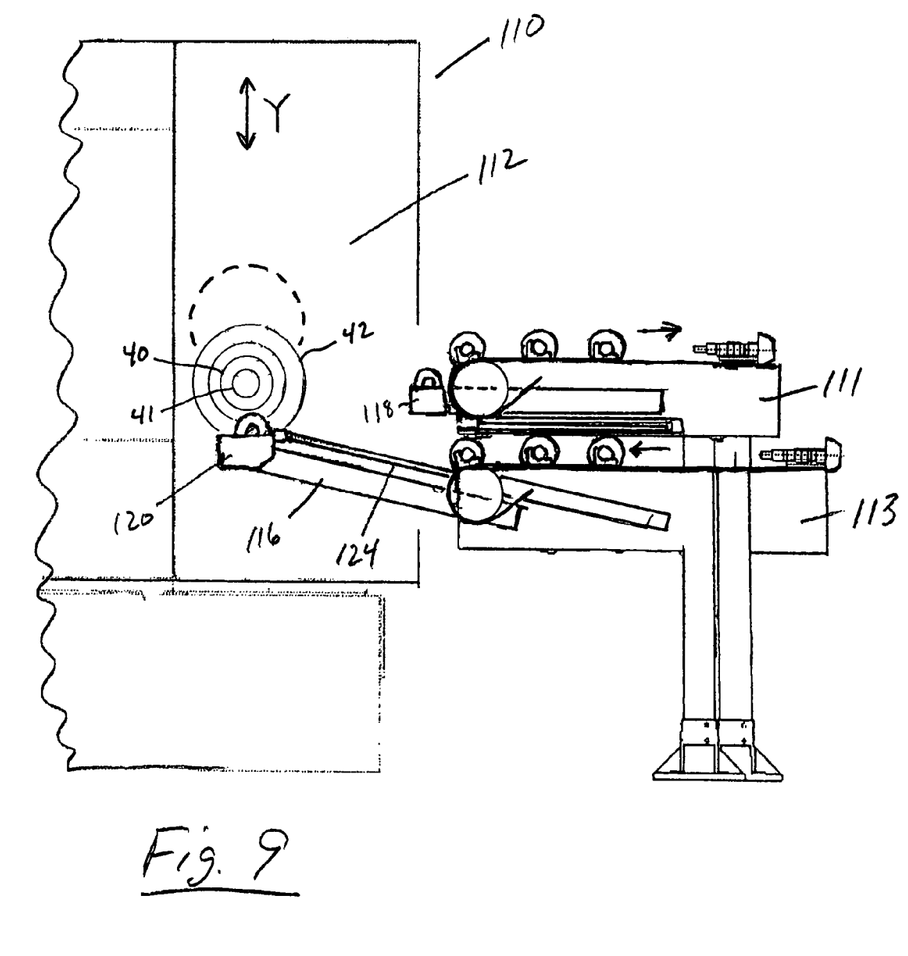
FIG. 9 shows the shuttle of FIG. 8 with an upper arm retracted.

FIGS. 8 and 9 show a shuttle system which is preferably utilized for transporting pinions into and out of the machining chamber 112 of a gear manufacturing machine 110. Machined pinions are taken away from machine 110 by a conveyor 111 and pinions to be machined are provided to machine 110 by conveyor 113. The shuttle system comprises a pair of extendable arms 114, 116 the each being fitted with a nest 118, 120. Movement of each arm 114, 116 through an opening in the side of the machine is effected by a respective cylinder 122, 124. The operation of the shuttle system will be explained below.

When machining is completed, shuttle arms 114 and 116 are advanced into position in the machining chamber 112. Upper nest 118 is empty and will receive the machined pinion while lower nest 120 carries a pinion to be machined having received the pinion from conveyor 113. With machining completed, a chucked pinion (FIG. 6) is dechucked (FIG. 5) and moved out of the workholding equipment 41 but still grasped (FIG. 4). The pinion is placed in upper nest 118 by downward movement of slide 46 in the Y direction. Once the pinion is placed in the nest, the pivoting finger 72 and contact rod 76 are retracted (FIG. 3) and the upper arm 114 is thereafter retracted to its inward position shown in FIG. 9 where the machined pinion is picked up by conveyor 111.

Once shuttle arm 114 is retracted, slide 46 is lowered further (Y direction) to align contact rod 76 and pivoting finger 72 so as to grasp the pinion on lower nest 120 (FIG. 4). The dotted line in FIG. 9 shows the position of the spindle and motor in FIG. 8. The slide 46 is moved slightly upward to provide clearance so that the lower arm 116 can be retracted. The pinion is then seated in the workholding equipment 41 (FIG. 5) and then chucked (FIG. 6). Slide 46 is then moved to the proper position for subsequent machining of the pinion. The described process is then repeated for each pinion.

While the described shuttle system is preferred, the present invention is not limited thereto. Other systems may be utilized to transport workpiece into and from the machining chamber. For example, a robot which grips the shank of a pinion may be used to present the pinion to the inventive loading/unloading assembly.

Although the inventive loading/unloading assembly has been described with reference to the machine of FIG. 1, one skilled in the art will readily understand that the inventive assembly can be applied to other manufacturing machines. As long as the particular machine has the ability to align the contact rod 76 with the inserted position of the tip 74 of the pivoting finger 72 (align the pinion centerline coincident with the workpiece spindle axis) as well as the ability to advance and retract the spindle relative to the inserted position of the tip 74 along the coincident axes, the inventive assembly can be utilized. Thus, even with other machine configurations, the inventive assembly may be effectively utilized for loading and unloading pinions or other parts that have front and rear centers.

Furthermore, if a workpiece spindle has the capability of movement in the Z direction of FIG. 1 or if the pivoting finger 72 is movable in the direction of the workpiece spindle axis, then positioning a pinion for grasping as described above with regard to proper Z direction position and X direction position are not necessary since machine elements can be moved to bring about the proper part position.

While a pinion with a shank (rear) center 70 has been discussed, the present invention also contemplates a mechanism on the end of contact rod 76 that would grip the end of a pinion shank in the instance where no shank center is present. Also, although a pinion has been discussed above with reference to the inventive loading and unloading assembly, the present invention is intended to include any toothed or blank workpiece (such as a ring gear) that includes centers which are appropriate for contact by the inventive assembly.

The present invention eliminates the need for multiple centering cups and jaw members as was required by the prior art mechanisms. With gripping a workpiece on its centers, a more accurate orientation is achieved and thus, tolerances of workholding mechanisms can be reduced resulting is a more accurate chucking and hence, a more accurate machined part. With the elimination of centering cups and jaw members, the time to replace these components is also eliminated thus permitting increased machine productivity.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. An apparatus for positioning a workpiece in a spindle of a machine tool and removing a workpiece therefrom, said spindle having an axis of rotation and said workpiece having a centerline extending between a first end surface and a second end surface, said apparatus comprising:

a mechanism for grasping the workpiece in a position proximate said spindle whereby said centerline is coincident with said axis of rotation, means to move said spindle relative to said workpiece in the direction of said axis of rotation whereby said workpiece is inserted into said spindle or removed from said spindle, wherein said mechanism includes a first gripping means for gripping the workpiece at the intersection of the first end surface and the centerline, said first gripping means being positionable between an engaged position and a disengaged position.

2. The apparatus of claim 1 wherein said workpiece is one of a gear or gear blank.

3. The apparatus of claim 1 wherein said first gripping means is located spaced from said spindle.

4. The apparatus of claim 2 wherein said gear or gear blank comprises a pinion having a shank.

5. The apparatus of claim 1 wherein said mechanism includes a second gripping means for gripping the workpiece at the second end surface.

6. The apparatus of claim 5 wherein the second end surface is gripped at the intersection of the second end surface and the centerline.

7. The apparatus of claim 5 wherein said second gripping means is located within said spindle and is positionable therein.

8. The apparatus of claim 1 wherein said machine tool comprises a machine for manufacturing gears.

9. The apparatus of claim 4 wherein the first end surface of said pinion is a front face having a center and the second end surface of said pinion is the end of said shank having a center, the front face center and the shank center defining the centerline.

* * * * *